United States Patent [19]
Brault et al.

[11] 4,157,546
[45] Jun. 5, 1979

[54] VARIABLE FREQUENCY RADAR SYSTEMS

[75] Inventors: Yves Brault; Roland Carré; Pierre Percy du Sert, all of Paris, France

[73] Assignee: Compagnie Generale de Telegraphie Sans Fil, France

[21] Appl. No.: 785,524

[22] Filed: Jan. 7, 1959

[30] Foreign Application Priority Data

Jan. 13, 1958 [FR] France .............................. 58.755733

[51] Int. Cl.² .............................................. G01S 9/23
[52] U.S. Cl. .............................................. 343/17.2 R
[58] Field of Search ............ 343/17.1, 17.1 R, 17.2 R, 343/17.2

[56] References Cited

U.S. PATENT DOCUMENTS

| | | | |
|---|---|---|---|
| 3,114,148 | 12/1963 | Lederman | 343/17.2 R X |
| 3,163,862 | 12/1964 | Jenny | 343/17.2 R X |
| 3,858,219 | 12/1974 | Hull | 343/17.2 R |
| 3,866,224 | 2/1975 | Porter et al. | 343/17.2 R |
| 3,981,012 | 9/1976 | Brault et al. | 343/17.2 R X |

Primary Examiner—T. H. Tubbesing
Attorney, Agent, or Firm—Haseltine, Lake & Waters

EXEMPLARY CLAIM

1. A system for radiating recurrent pulsed signals having a variable carrier frequency, said system comprising: a source of signals having a random voltage: a non-linear amplifier coupled to said source for amplifying said signals and providing amplified signals, said amplifier having a gain which decreases upon the amplitude of said signals exceeding a predetermined absolute value and having an output; means coupled to said output of said amplifier for storing an amplified signal for the duration of each recurrence period of said pulsed signals; and variable frequency, voltage controlled oscillator means coupled to said storing means.

17 Claims, 4 Drawing Figures

VARIABLE FREQUENCY RADAR SYSTEMS

The present invention relates to variable frequency radar systems, i.e. radar systems wherein the pulse modulated carrier frequency on which the radar transmits is caused to vary during the transmission with a view towards minimizing jamming and fading effects.

The constant endeavour in the radar systems of this type is to transmit on a frequency which is as completely random as possible within a substantial frequency band. However, it is well known that it is rather difficult to obtain this object, whatever the technique used to this effect. More particularly, experience shows that, even if a source operating on a random frequency, such as a noise tube, is used, certain frequencies are likely to occur more frequently than others, the whole of the frequencies ranging along a curve of the Gaussian type. Thus, there is more probability of the system's transmitting on certain frequencies than on others and, on the whole, the frequency is not as thoroughly random as might be desirable. This may constitute in certain cases a considerable drawback in so far as fading and jamming is concerned.

Therefore, it is an object of the invention to provide a radar system and more particularly the pilot stage of a radar system, wherein the probability of the system's operating is the same for all the frequencies comprised within a predetermined frequency band, thereby making jamming all the more difficult and minimizing the fading effect.

A system for radiating pulsed signals according to the invention comprises a source of signals having a random voltage coupled to a non linear amplifier system having a gain which decreases upon the amplitude of said signals exceeding a predetermined absolute value, means for storing an amplified signal for the duration of each recurrence period of said pulsed signals and variable frequency, voltage controlled pilot and local oscillator means coupled to said storing means for the control of their frequency by the stored signal.

Other features and advantages of the invention will appear from the following description and the appended drawing, given solely by way of example and wherein.

For a better understanding of the following specification, it is to be noted that both the pilot oscillator used for transmission and the local oscillator used for reception are wide band tubes, for instance tubes known under the trade mark "Carcinotron" of the O type, the frequency of which is, as is well known, a substantially linear function of the voltage applied between the delay line of the tube and its cathode. Thus, to each voltage value, this voltage having been amplified if necessary, corresponds a given oscillation frequency.

Figure 1:
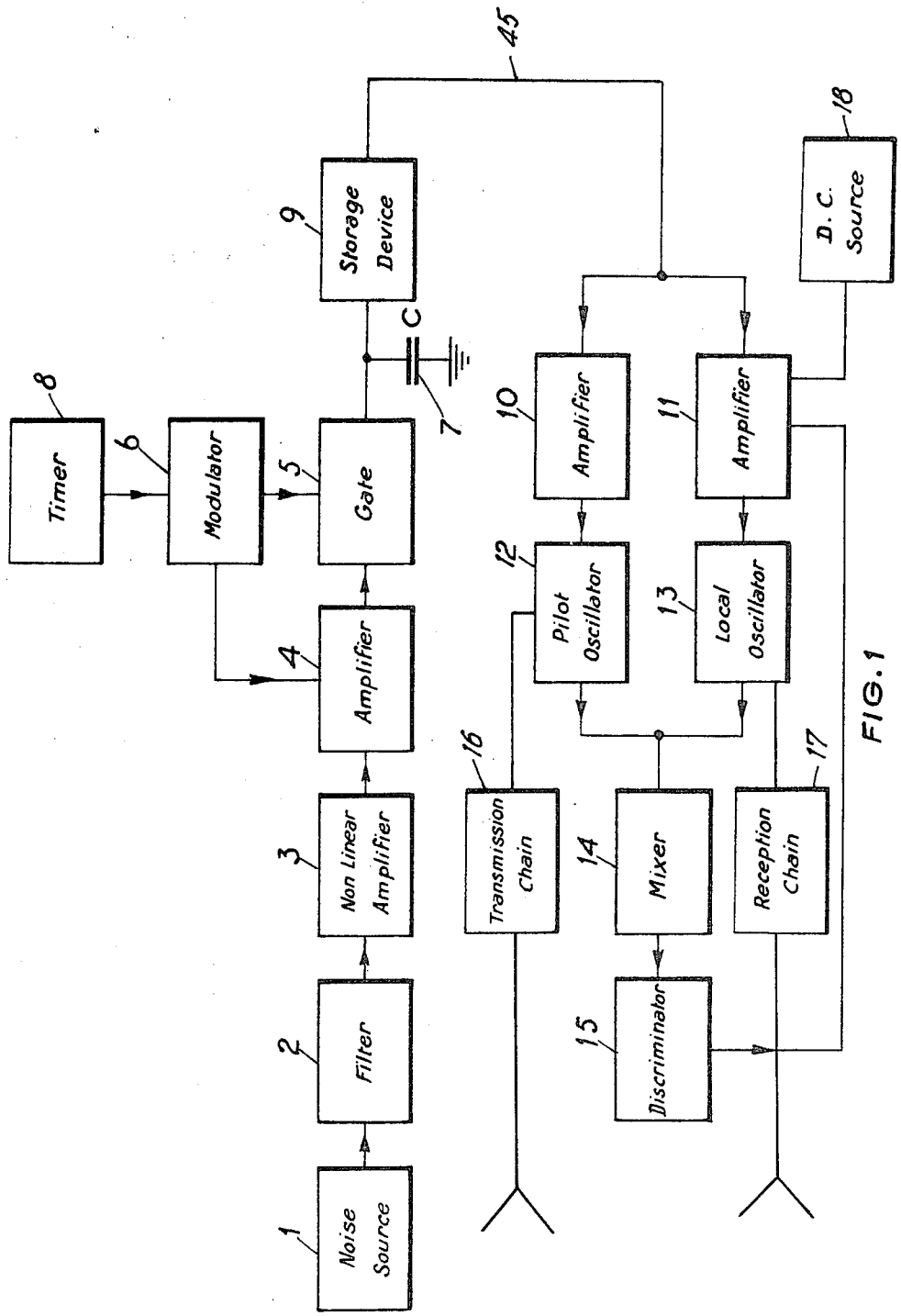
FIG. 1 is a block diagram of a system according to the invention.

Referring to FIG. 1, there is provided a noise source 1 of any known type. It comprises, for instance, an argon filled thyratron tube and may include an automatic gain control system of any known type to maintain a constant RMS noise amplitude.

The resulting noise normally covers the frequency band which ranges from a few cycles per second to several megacycles per second.

Noise source 1 is followed by a pass-band filter 2 the lower cut off frequency of which is of about 500 c/s so as to eliminate hum interference from the power supply source. The upper passing frequency is about 5 Kc/s, this value being selected for reasons to be stated.

It is well known that the noise voltage at the output of band-pass filter 2 will assume voltage values ranging, as already pointed out, about a mean voltage value in accordance with a Gaussian probability curve. It is an object of the invention to transform this Gaussian probability into a probability which is equal for all the voltage values, within a certain voltage range about this mean voltage, with zero probability out of this range.

The voltages within the limits thus defined are then used for controlling the radiated frequency. Accordingly, the probability of transmitting any one of the frequencies corresponding to the above voltage range is equal, so that the number of transmissions on all frequencies is on the average equal.

Figure 2:
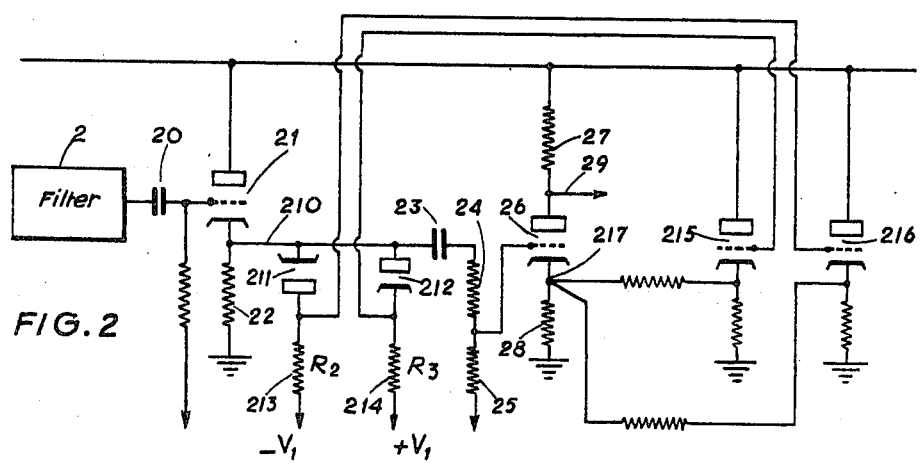
FIG. 2 illustrates very diagrammatically a non linear amplifier used in the system of FIG. 1.

To this end, noise voltages derived from filter 2 are fed, as shown in FIG. 2, through a capacitor 20 to a non linear amplifier 3, an embodiment of which will be next described with reference to FIG. 2.

The amplifier 3 comprises a tube 21 connected as a cathode follower. Capacitor 20 is coupled to the grid of tube 21. The voltage which appears across a load 22 which is connected to the cathode of tube 21 is applied through a capacitor 23 and a resistance bridge 24–25 to the grid of an amplifier tube 26. The gain of this tube is defined approximately by the ratio of the resistances 27 and 28, respectively located in the anode and the cathode circuits of this tube. The output voltage appears at 29 on the anode of tube 26.

The device also comprises a gain correcting system: output 210 of the cathode of tube 21 is coupled to two oppositely poled diodes 211 and 212, which are respectively biased against conduction to $-V_1$ and $+V_1$, with respect to the average noise voltage taken as the reference voltage, thus establishing two conduction thresholds in opposite directions.

Consequently, as soon as the amplitude of the voltage collected at the output 210 of amplifier tube 21 exceeds $\pm V_1$, diode 211 or diode 212 becomes conductive, thus providing across load resistance 213 or 214 a voltage difference which is applied as a biasing voltage to cathode 217 of amplifier tube 26, through tubes 215 or 216.

Figure 3:
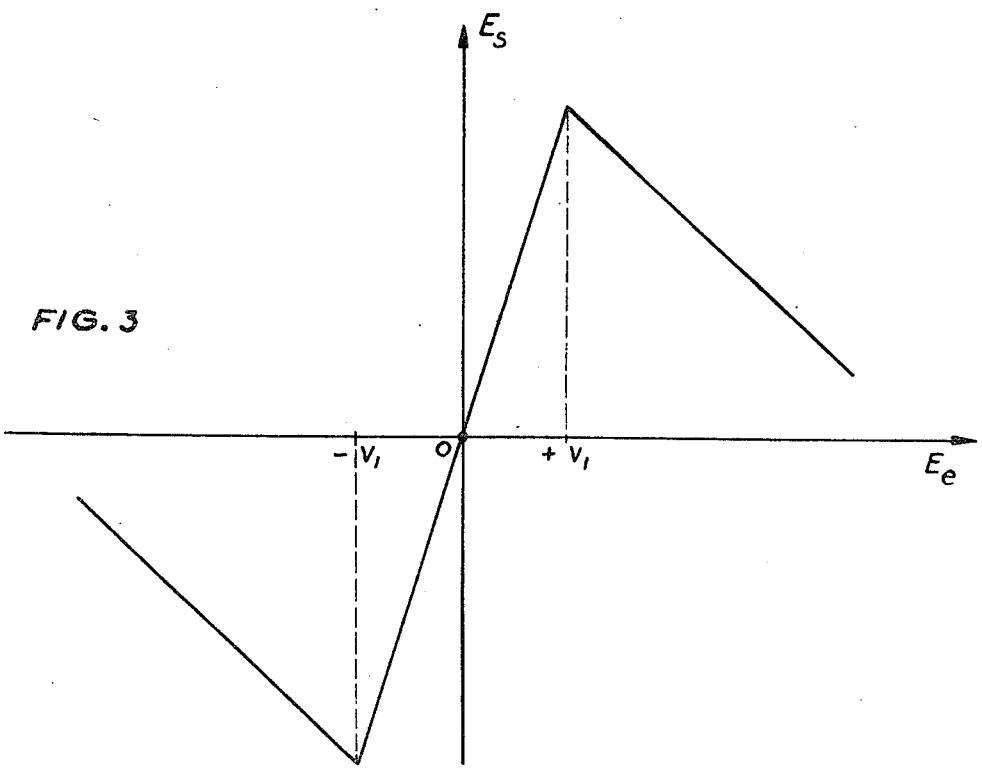
FIG. 3 shows the gain characteristic of the amplifier of FIG. 2.

It has been proved mathematically that for a noise voltage source with a Gaussian probability distribution applied to this amplifier, the output is no longer Gaussian. For specific values of amplifier elements, it has been found that one can obtain a probability distribution substantially constant for a given voltage range, the distribution being zero outside this range. Experimental results are in agreement with the theory. The slopes of the curve as shown in FIG. 3 must be such as to be nearly equal and of inverse sign. The values of $+E$ and $-E$ are determined from RMS value of the noise input source by known mathematical methods.

The output signals of amplifier 3 are then applied to a conventional linear amplifier 4, arranged for providing at its output a current of the order of several hundreds of milliamperes for an impedance of a few ohms. The source thus provided is then used for charging a storage device 9, as will be explained hereinafter.

The output of amplifier 4 feeds a voltage selector or gating device 5. Amplifier 4 and selector device 5 which may be of any suitable conventional type are opened, during very short periods, for example of the order of about 20 microseconds, through a modulator 6, which, in turn, is controlled by the general synchronisation circuit or timer 8 of the radar system.

The period corresponding to the highest noise frequency must be comparatively large with respect to the opening time of the gating device 5, so that the voltage fed to the storage system 9 should not vary substantially during this time interval. This is why the upper cut off frequency of the band filter 2 should not exceed 5 Kc/s, as metioned above.

Figure 4:
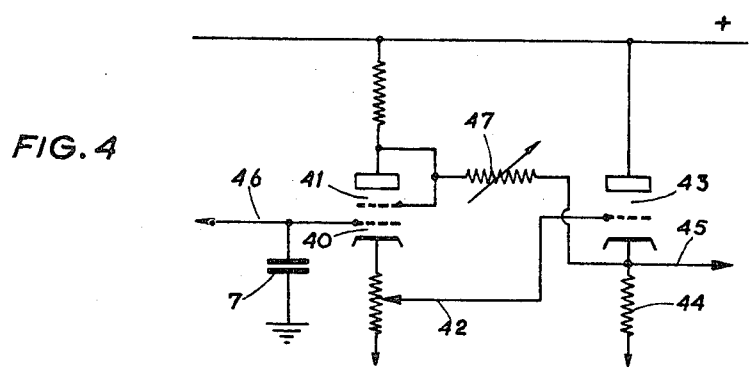
FIG. 4 is a simplified diagram of a storage device used in the system of FIG. 1.

Selector or gate 5 provides the connection between amplifier 4 and storage device 9 which comprises a capacitor 7 and an electrometer tube 41 shown in FIG. 4, and the main function of gate 5 is to charge capacitor 7 when triggered into action and to prevent it from discharging between two consecutive pulses.

To this end capacitor 7 is of a type having a low hysteresis and a low leakage current.

FIG. 4 shows storage device 9 with some detail. Capacitor 7 is loaded at 46 through selector 5 each time a pulse is transmitted by the radar system. The capacitor is connected to grid 40 of electrometer tube 41, having a very high resistance. The cathode voltage of tube 41 is applied through a potentiometer device 42 to the grid of tube 43. The cathode of this latter tube is connected to the anode of tube 41, through a non linear resistance 47. The output voltage is collected at 45 on cathode of tube 43.

It is important that the voltage to which capacitor 7 is charged remains constant during each active period of selector 5, i.e. between the successive pulses transmitted by the radar system. As is well known, this will be obtained for a given electrometer tube if the potential difference between the cathode and the anode of this tube has the desired value for keeping the grid current of the tube at a zero value. Since obviously the current through tube 41 will vary as the voltage of capacitor 7 varies from one recurrence period to another, the potential difference between the anode and the cathode of tube 41 will vary, unless something is done to keep this voltage difference constant by compensating for the action of the voltage variations of capacitor 7 which may be readily of the order of ±20 volts. This is what the device shown in FIG. 4 achieves. The cathode voltage of tube 41 is applied to the grid of tube 45. Since the cathode of this tube is coupled to the anode of tube 41 through a non linear resistance 47 any variation of the cathode voltage of tube 41 is applied to the anode of this tube. In this way the anode-cathode voltage of this tube remains substantially constant and the discharge current of capacitor 7 is kept down to about one microampere as desired.

The output voltage at 45 of storage device 9 which is made substantially constant between two successive radar pulses, is applied to two feedback amplifiers 10 and 11 of the conventional type, connected in parallel, as shown in FIG. 1, for respectively providing the frequency control voltages of two wide band oscillators 12 and 13. Oscillator 12 is the pilot oscillator and is connected to the radar transmission chain 16. Oscillator 13 is the local oscillator and is connected to the reception chain 17.

Before being fed to amplifier 11, the output voltage from the storage device 9 is transposed to a different value by adding thereto a d.c. voltage provided by an auxiliary source 18 in order for the frequency of the local oscillator 13 to be shifted with respect to the frequency of the pilot oscillator by a value substantially equal to the radar receiver intermediate frequency, for instance 30 Mc/second.

The system of the invention may be completed by a conventional automatic frequency control, comprising a mixer 14 wherein the outputs of oscillators 12 and 13 are mixed. A frequency discriminator 15, also of a conventional type, is in this case coupled to the output of mixer 14 to provide in a feedback loop the correction voltage for amplifier 11 in order to keep the frequency difference between oscillators 12 and 13 constantly equal to the intermediate frequency of the receiver, which frequency is thus stabilized, in spite of the random variations of the carrier frequency of the radiated pulses.

Experience shows that constant frequency controlling voltages are thus effectively obtained during each recurrence period between successive transmission pulses. The probability of obtaining any one of the frequencies comprised in the frequency range of oscillators 12 and 13 as determined by the voltage range of the signals provided by the non linear amplifier 3, follows a substantially rectangular law. In fact this probability has been found to be equal for all the frequencies within about 10%.

Voltage fluctuations across capacitor 7 have been found to be less than 10 millivolts for voltages comprised between +20 and −20 volts. This involves a frequency fluctuation of the order of only 30 Kc/s for the "Carcinotron" pilot tube which was used, which has practically no bearing on the operation of the system as desired.

It is to be understood that the invention is not limited to embodiments illustrated and described, which have been given only as an example.

What is claimed is:

1. A system for radiating recurrent pulsed signals having a variable carrier frequency, said system comprising: a source of signals having a random voltage: a non-linear amplifier coupled to said source for amplifying said signals and providing amplified signals, said amplifier having a gain which decreases upon the amplitude of said signals exceeding a predetermined absolute value and having an output; means coupled to said output of said amplifier for storing an amplified signal for the duration of each recurrence period of said pulsed signals; and variable frequency, voltage controlled oscillator means coupled to said storing means.

2. A system for radiating recurrent pulsed signals having a variable carrier frequency, said system comprising: a source of signals having a random voltage; filtering means coupled to said source for filtering a predetermined frequency band; a non-linear amplifier coupled to said filtering means for amplifying said signals and providing amplified signals, said amplifier having a gain which decreases upon the amplitude of said signals exceeding a predetermined absolute value and having an output; means coupled to said output of said amplifier for storing an amplified signal for the duration of each recurrence period of said pulsed signals; and variable frequency, voltage controlled oscillator means coupled to said storing means.

3. A system for radiating recurrent pulsed signals having a variable carrier frequency, said system comprising: a noise source for providing signals having a random voltage; filtering means for filtering said signals; a non-linear amplifier coupled to said means for amplifying said signals and providing amplified signals, said amplifier having a gain which decreases upon the amplitude of said signals exceeding a predetermined absolute value and having an output; means coupled to said output of said amplifier for storing an amplified signal for the duration of each recurrence period of said pulsed signals, and a variable frequency, voltage controlled pilot oscillator and a variable frequency, voltage controlled local oscillator coupled to said storing means.

4. A system for radiating recurrent pulsed signals having a variable carrier frequency, said system comprising: a source for providing noise signals having a random voltage; a non-linear amplifier coupled to said source for amplifying said signals and providing amplified signals, said amplifier having a gain which decreases upon the amplitude of said signals exceeding a predetermined absolute value; means for storing said amplified signal for the duration of each recurrence period of said pulsed signals; an electronically tunable pilot oscillator and a electronically tunable local oscillator having frequency control inputs respectively coupled to said storing means; means for shifting the frequency of one oscillator with respect to the frequency of the other by a predetermined amount; mixing means for mixing the respective output signals of said oscillator; a frequency discriminator coupled to said mixing means; and a feedback loop between said discriminator and one of said oscillators for keeping constant the difference between their respective frequencies.

5. A system for radiating recurrent pulsed signals having a variable carrier frequency, said system comprising: a source of signals having a random voltage; a non-linear amplifier coupled to said source for amplifying said signals and providing amplified signals, said amplifier having a gain which decreases upon the amplitude of said signals exceeding a predetermined absolute value; gating means; means for actuating said gating means upon the transmission of each of said pulsed signals; means for storing an amplified signal provided by said non linear amplifier for the duration of each recurrence period of said pulsed signals; said storing means being coupled to said amplifier through said gating means; and variable frequency, voltage controlled oscillator means coupled to said storing means.

6. A system for radiating recurrent pulsed signals having a variable carrier frequency, said system comprising: a source of signals having a random voltage; a non-linear amplifier system comprising an input coupled to said source, an amplifier tube having an anode, a control grid and a cathode, means for coupling said input of said amplifier system to said control grid of said amplifier tube, said means comprising threshold means for applying that portion of said signal voltage which exceeds in absolute value a predetermined level across said anode and said cathode for reducing the gain of said amplifier; means coupled to said amplifier for storing a signal amplified by said amplifier for the duration of each recurrence period of said pulsed signals; and variable frequency, voltage controlled oscillator means coupled to said storing means.

7. A system for radiating recurrent pulsed signals having a variable carrier frequency, said system comprising: a source of signal having a random voltage; a non-linear amplifier system comprising an input coupled to said source; an amplifier tube having an anode, a control grid and a cathode, means for coupling said input of said amplifier system to said control grid of to said amplifier tube, said means comprising threshold means for applying that portion of said signal voltage which exceeds in absolute value a predetermined level across said anode and said cathode for reducing the gain of said amplifier; gating means; means for actuating said gating means upon the transmission of each of said pulsed signals; means for storing a signal amplified by said amplifier for the duration of each recurrence period of said pulsed signals; said storing means being coupled to said amplifier system through said gating means; and a variable frequency voltage controlled pilot oscillator and a variable frequency, voltage controlled local oscillator coupled to said storing means.

8. A system for radiating recurrent pulsed signals having a variable frequency, said system comprising: a source of signals having a random voltage; a pass band filter coupled to said source for filtering a predetermined frequency band; a non-linear amplifier system comprising an input coupled to said filter, an amplifier tube having an anode, a control grid and a cathode, means for coupling said input of said amplifier system to said control grid of said amplifier tube, said means comprising threshold means for applying that portion of said signal voltage which exceeds in absolute value a predetermined level across said anode and cathode for reducing the gain of said amplifier; gating means; means for actuating said gating means upon the transmission of each of said pulsed signals; means for storing a signal amplified by said amplifier for the duration of each recurrence period of said pulsed signals; said storing means being coupled to said amplifier system through said gating means; and a variable frequency, voltage controlled pilot oscillator and a variable frequency, voltage controlled local oscillator coupled to said storing means.

9. A system for radiating recurrent pulsed signals having a variable carrier frequency, said system comprising: a source of signals having a random voltage; a non-linear amplifier system comprising an input, an amplifier tube having a cathode, an anode and a grid, means for coupling said source of signals to said grid, two diodes oppositely coupled in parallel to said coupling means and having outputs, means for biasing said diodes against conduction to a predetermined level and means for applying the voltage at said output across said cathode and said anode for reducing the gain of said amplifier; means coupled to said amplifier for storing a signal amplified by said amplifier for the duration of each recurrence period of said pulsed signals; and variable frequency, voltage controlled oscillator means coupled to said storing means;

10. A system for radiating recurrent pulsed signals having a variable carrier frequency, said system comprising: a source of signals having a random voltage; a non linear amplifier system for amplifying said random voltage signal comprising an input coupled to said source, an amplifier tube having a cathode, an anode and a grid, means for coupling said input to said grid, two diodes oppositely coupled in parallel to said means and having outputs, means for biasing said diodes against conduction to a predetermined level and means for applying the voltage at said outputs across said cathode and said anode for reducing the gain of said amplifier; means for storing a random voltage amplified signal for the duration of each recurrence period of said pulsed signals; gating means; means for actuating said gating means upon the transmission of each of said pulsed signals; said storing means being coupled to said amplifier through said gating means; and a variable frequency, voltage controlled pilot oscillator and a variable frequency, voltage controlled local oscillator coupled to said storing means.

11. A system for radiating recurrent pulsed signals having a variable carrier frequency, said system comprising: a source of signals having a random voltage; a pass band filter coupled to said source for filtering a predetermined frequency band; a non-linear amplifier system for amplifying a random voltage filtered signal comprising an input coupled to said filter, an amplifier tube having a cathode, an anode and a grid, means for coupling said input to said grid, two diodes oppositely coupled in parallel to said means and having outputs, means for biasing said diodes against conduction to a predetermined level and means for applying the voltage at said outputs across said cathode and said anode for reducing the gain of said amplifier; means for storing a random voltage filtered and amplified signal for the duration of each recurrence period of said pulsed signals; gating means; means for actuating said gating means upon the transmission of each of said pulsed signals; said storing means being coupled to said amplifier through said gating means; and a variable frequency, voltage controlled pilot oscillator and a variable frequency, voltage controlled local oscillator coupled to said storing means.

12. A system for radiating recurrent pulsed signals having a variable carrier frequency, said system comprising: a source of signals having a random voltage; a non-linear amplifier coupled to said source for amplifying said signals and providing amplified signals, said amplifier having a gain which decreases upon the amplitude of said signals exceeding a predetermined absolute value; means for storing said amplified signal for the duration of each recurrence period of said pulsed signals, said means comprising a capacitor and means for preventing said capacitor from discharging; and variable frequency, voltage responsive oscillator means coupled to said storing means.

13. A system for radiating recurrent pulsed signals having a variable frequency carrier, said system comprising: a source of signals having a random voltage; a non-linear amplifier coupled to said source for amplifying said signals and providing amplified signals, said amplifier having a gain which decreases upon the amplitude of said signals exceeding a predetermined absolute value; means for storing an amplified signal for the duration of each recurrence period of said pulsed signals, said means comprising a capacitor and means for preventing said capacitor from discharging, said last mentioned means comprising an electron tube having an anode, a grid, and a cathode, said capacitor being coupled to said grid, and means for keeping constant the voltage across said anode and said cathode; an electronically tunable pilot oscillator and an electronically tunable local oscillator having frequency respective control inputs coupled to said storing means; means for shifting the frequency of one oscillator with respect to the frequency of the other oscillator by a predetermined amount; mixing means for mixing the respective output signals of said oscillators; a frequency discriminator coupled to said mixing means and a feedback loop between said discriminator and one of said oscillators for keeping constant the difference between their respective frequencies.

14. A system for radiating recurrent pulsed signals having a variable frequency carrier, said system comprising: a source of signals having a random voltage; a non-linear amplifier coupled to said source for amplifying said signals and providing amplified signals, said amplifier having a gain which decreases upon the amplitude's of said signals exceeding a predetermined absolute value; means for storing said amplified signal for the duration of each recurrence period of said pulsed signals, said means comprising a capacitor, an electron tube having a grid, an anode and a cathode, said capacitor being coupled to said grid and means for keeping constant the voltage across said anode and said cathode; and variable frequency voltage oscillator means coupled to said storing means.

15. A system for radiating recurrent pulsed signals having a variable carrier frequency, said system comprising: a source of signals having a random voltage; a non-linear amplifier system comprising an input coupled to said source, an amplifier tube having a cathode, an anode and a grid, means for coupling said input to said grid, two diodes oppositely coupled in parallel to said means and having outputs, means for biasing said diodes against conduction to a predetermined level and means for coupling said outputs for applying the voltage at said outputs across said cathode and said anode for reducing the gain of said amplifier; gating means; means for actuating said gating means upon the transmission of each of said pulsed signals; means coupled through said gating means to said amplifier system, for storing an amplified signal for the duration of each recurrence period of said pulsed signals, said means comprising a capacitor, an electron tube having a grid and a first and a second outer electrode, said first electrode being an anode and the said second electrode a cathode, said capacitor being coupled to said grid, an output tube having a grid and two outer electrodes, one being an anode and the other a cathode, means for collecting output signals on one of the said first and said second electrodes of said electron tube and for feeding them to said grid of said output tube, a non-linear resistor, and means for applying through said non-linear resistor the signals collected on one outer electrode of said output tube to the other of said first and said second electrode of said electron tube; and a variable frequency, voltage controlled pilot oscillator and a variable frequency, voltage controlled local oscillator coupled to said output tube for receiving said output signal of said tube.

16. A system for radiating recurrent pulsed signals having a variable carrier frequency, said system comprising: a noise source for providing signals having a random voltage; a pass band filter coupled to said source for filtering a predetermined frequency band; a non-linear amplifier system comprising an input coupled to said filter, an amplifier tube having a cathode, an anode and a grid, means for coupling said input to said grid, two diodes oppositely coupled in parallel to said means and having outputs, means for biasing said diodes against conduction to a predetermined level and means for coupling said outputs for applying the voltage at said outputs across said cathode and said anode for reducing the gain of the amplifier; gating means; means for actuating said gating means upon the transmission of each of said pulsed signals; means for storing an amplified signal for the duration of each recurrence period of said pulsed signals, said storing means being coupled to said amplifier system through said gating means and comprising a capacitor, an electron tube having a cathode, an anode and a grid, said capacitor being coupled to said grid, an output tube having a cathode, an anode and a grid, said cathode of said electron tube being coupled to said grid of said output tube, a non-linear resistor and means for applying through said non-linear resistor to the anode of said electron tube the output signal of said output tube, collected at the cathode thereof; and a variable frequency, voltage controlled pilot oscillator and a variable frequency, voltage controlled local oscillator coupled to said cathode of said output tube.

17. A system for radiating recurrent pulsed signals having a variable carrier frequency, said system comprising: a noise source for providing signals having a random voltage; a pass band filter coupled to said source for filtering a predetermined frequency band; a non-linear amplifier system comprising an input coupled to said filter, an amplifier tube having a cathode, an anode and a grid means for coupling said input to said grid, two diodes oppositely coupled in parallel to said means and having outputs, means for biasing said diodes against conduction to a predetermined level and means for coupling said outputs for applying the voltage at said outputs across said cathode and said anode for reducing the gain of the amplifier; gating means; means for actuating said gating means upon the transmission of each of said pulsed signals; means for storing an amplified signal for the duration of each recurrence period of said pulsed signals, said storing means being coupled to said amplifier system through said gating means and comprising a capacitor, an electron tube having a cathode, an anode and a grid, said capacitor being coupled to said grid, an output tube having a cathode, and a grid, said cathode of said electron tube being coupled to said grid of said output tube, a non-linear resistor and means for applying through said non-linear resistor to the anode of said electron tube the output signal of said output tube, collected at the cathode thereof; a variable frequency, voltage controlled pilot oscillator and a variable frequency voltage controlled local oscillator coupled to said cathode of said output tube for receiving therefrom voltage signals for frequency controlling their respective frequencies; means for shifting one of said voltages with respect to the other by a predetermined amount; a mixer for mixing the respective output signals of said oscillators; a frequency discriminator responsive to the beat frequency provided by said mixer; and a feedback loop between said discriminator and one of said oscillators for keeping constant the frequency difference between said oscillators.

* * * * *